United States Patent
Deakins et al.

(10) Patent No.: US 12,347,342 B2
(45) Date of Patent: Jul. 1, 2025

(54) DRIVING SIMULATION SCORING SYSTEM

(71) Applicant: FAAC Incorporated, Ann Arbor, MI (US)

(72) Inventors: Chuck Deakins, Norco, CA (US); William Martin, Perrysburg, OH (US); Travis Staley, Jackson, MI (US); Steven Olson, Ann Arbor, MI (US); Christopher Hegarty, Castle Rock, CO (US); David S. Bouwkamp, Dexter, MI (US)

(73) Assignee: FAAC Incorporated, Ann Arbor, MI (US)

( * ) Notice: Subject to any disclaimer, the term of this patent is extended or adjusted under 35 U.S.C. 154(b) by 131 days.

(21) Appl. No.: 17/559,410

(22) Filed: Dec. 22, 2021

(65) Prior Publication Data

US 2022/0114910 A1   Apr. 14, 2022

Related U.S. Application Data

(63) Continuation-in-part of application No. 16/376,621, filed on Apr. 5, 2019, now Pat. No. 11,244,579, which is a continuation-in-part of application No. 16/009,862, filed on Jun. 15, 2018, now Pat. No. 11,132,916.

(60) Provisional application No. 62/520,383, filed on Jun. 15, 2017.

(51) Int. Cl.
| | |
|---|---|
| G09B 9/052 | (2006.01) |
| G06F 3/01 | (2006.01) |
| G06F 3/02 | (2006.01) |
| G06F 3/14 | (2006.01) |
| G08B 7/06 | (2006.01) |

(52) U.S. Cl.
CPC ............. *G09B 9/052* (2013.01); *G06F 3/011* (2013.01); *G06F 3/02* (2013.01); *G06F 3/14* (2013.01); *G08B 7/06* (2013.01)

(58) Field of Classification Search
None
See application file for complete search history.

(56) References Cited

U.S. PATENT DOCUMENTS

| | | | |
|---|---|---|---|
| 2006/0040239 A1* | 2/2006 | Cummins | ................ G09B 9/05 434/62 |
| 2008/0254417 A1 | 10/2008 | Mohamed | |

* cited by examiner

*Primary Examiner* — Kesha Frisby
(74) *Attorney, Agent, or Firm* — Howard & Howard Attorneys PLLC

(57) ABSTRACT

A driving simulation system includes a simulated driver cockpit which includes simulated controls, a display control input, and a video display providing a simulated driving environment to the driver. The system further includes a computerized simulation control module including programming to operate a driving simulation. The driving simulation includes driving rules. The module further including programming to monitor performance of the driver during the driving simulation and compare the performance of the driver to the driving rules. The module further includes programming to generate an untextualized feedback regarding performance of the driver relative to the driving rules, monitor an input by the driver to the display control input, and selectively display the untextualized feedback to the driver based upon the input by the driver to the display control input. The selective display is operable to enable private viewing of the untextualized feedback by the driver.

20 Claims, 11 Drawing Sheets

| Time | Milestone | Evaluation | Rating |
|---|---|---|---|
| 6/15/2017 3:17:37 | User Responds to Call | User Successfully Called | GREEN |
| 6/15/2017 3:17:52 | User Starts Vehicle | User Started Vehicle - USER FAILED TO STAIGHTEN WHEEL | RED |
| 6/15/2017 3:17:52 | User STATE SOP - Body Cam Activated Before Vehicle Start | User body cam activated | GREEN |
| 6/15/2017 3:18:25 | User Position Exiting Station | User in optimal position | RED |
| 6/15/2017 3:18:39 | User Position in Lane 1 | User not in optimal position, too close to curb | YELLOW |
| 6/15/2017 3:19:12 | User Speed In Lane 1 | User was above 50 mph | RED |
| 6/15/2017 3:19:40 | User Intersection 1 EM Lights | Lights turned on 0.5 secs after entering intersection | YELLOW |
| 6/15/2017 3:20:01 | User Intersection 1 Siren | Siren turned on prior to entering intersection | GREEN |
| 6/15/2017 3:20:27 | User Intersection 1 Speed | User was at correct speed through intersection | GREEN |
| 6/15/2017 3:20:31 | User Position in Lane 2 | User in optimal position | GREEN |
| 6/15/2017 3:21:15 | User Speed in Lane 2 | User below recommended speed | YELLOW |
| 6/15/2017 3:21:39 | User Approach Scene Position | User out of lane position | RED |
| 6/15/2017 3:22:11 | User Stop Scene Position | User stopped too far from scene | YELLOW |
| 6/15/2017 3:22:57 | User Stop Scene Lane Block | User successfully blocked lane | GREEN |
| 6/15/2017 3:23:20 | User Overall Distance from Pedestrians | User came within 10 feet of pedestrians twice - User did not come closer than 5 feet to any pedestrian | YELLOW |
| 6/15/2017 3:23:20 | User Overall Collision | User bumped curb, User collided with one parked car | RED |
| 6/15/2017 3:23:20 | User LOCAL SOP - Call Announce Arrival | User failed to call announce arrival | RED |
| 6/15/2017 3:23:20 | User LOCAL SOP - Siren Off at Scene | User successfully turned off siren | GREEN |
| 6/15/2017 3:23:20 | User STATE SOP - Engine Off at Scene | User failed to stop engine at scene for 30 seconds | YELLOW |

| Time | Milestone | Evaluation | Rating |
|---|---|---|---|
| 6/15/2017 3:17:37 | User Responds to Call | User Successfully Called | GREEN |
| 6/15/2017 3:17:52 | User Starts Vehicle | User Started Vehicle - USER FAILED TO STAIGHTEN WHEEL | RED |
| 6/15/2017 3:17:52 | User STATE SOP - Body Cam Activated Before Vehicle Start | User body cam activated | GREEN |
| 6/15/2017 3:18:25 | User Position Exiting Station | User in optimal position | RED |
| 6/15/2017 3:18:39 | User Position in Lane 1 | User not in optimal position, too close to curb | YELLOW |
| 6/15/2017 3:19:12 | User Speed in Lane 1 | User was above 50 mph | RED |
| 6/15/2017 3:19:40 | User Intersection 1 EM Lights | Lights turned on 0.5 secs after entering intersection | YELLOW |
| 6/15/2017 3:20:01 | User Intersection 1 Siren | Siren turned on prior to entering intersection | GREEN |
| 6/15/2017 3:20:27 | User Intersection 1 Speed | User was at correct speed through intersection | GREEN |
| 6/15/2017 3:20:31 | User Position in Lane 2 | User in optimal position | GREEN |
| 6/15/2017 3:21:15 | User Speed in Lane 2 | User below recommended speed | YELLOW |
| 6/15/2017 3:21:39 | User Approach Scene Position | User out of lane position | RED |
| 6/15/2017 3:22:11 | User Stop Scene Position | User stopped too far from scene | YELLOW |
| 6/15/2017 3:22:57 | User Stop Scene Lane Block | User successfully blocked lane | GREEN |
| 6/15/2017 3:23:20 | User Overall Distance from Pedestrians | User came within 10 feet of pedestrians twice - User did not come closer than 5 feet to any pedestrian | YELLOW |
| 6/15/2017 3:23:20 | User Overall Collision | User bumped curb, User collided with one parked car | RED |
| 6/15/2017 3:23:20 | User LOCAL SOP - Call Announce Arrival | User failed to call announce arrival | RED |
| 6/15/2017 3:23:20 | User LOCAL SOP - Siren Off at Scene | User successfully turned off siren | GREEN |
| 6/15/2017 3:23:20 | User STATE SOP - Engine Off at Scene | User failed to stop engine at scene for 30 seconds | YELLOW |

FIG. 9

DRIVING SIMULATION SCORING SYSTEM

CROSS REFERENCE TO RELATED APPLICATIONS

This disclosure is a continuation-in-part application of U.S. patent application Ser. No. 16/376,621 filed on Apr. 5, 2019 which is a continuation-in-part application of U.S. patent application Ser. No. 16/009,862 filed on Jun. 15, 2018, which has issued as U.S. Pat. No. 11,132,916, which claims the benefit of U.S. Provisional Application No. 62/520,383 filed on Jun. 15, 2017, all of which are hereby incorporated by reference.

TECHNICAL FIELD

This disclosure is related to a scoring system for use with a driving simulator used to train students, and in particular to train drivers.

BACKGROUND

The statements in this section merely provide background information related to the present disclosure. Accordingly, such statements are not intended to constitute an admission of prior art.

Driving simulators are known in the art. Such simulators include limited programming to discern whether the driver passes certain minimum skill criteria. Driving simulators can include standard driving rules such as speed limits and collision indications. Scoring indications can be provided, for example, rating the driver as having a percentage grade.

SUMMARY

A driving simulation system is configured to train a driver. The system includes a simulated driver cockpit which includes simulated vehicle controls, a display control input, and at least one video display providing a simulated driving environment to the driver. The system further includes a computerized simulation control module including programming to operate a driving simulation through the simulated driver cockpit. The driving simulation includes driving rules. The computerized simulation control module further includes programming to monitor performance of the driver during the driving simulation and compare the performance of the driver to the driving rules. The computerized simulation control module further includes programming to generate an untextualized feedback regarding performance of the driver relative to the driving rules, monitor an input by the driver to the display control input, and selectively display the untextualized feedback to the driver based upon the input by the driver to the display control input. The selective display is operable to enable private viewing of the untextualized feedback by the driver.

In some embodiments, the computerized simulation control module further includes programming to selectively hide the untextualized feedback based upon a second input by the driver to the display control input.

In some embodiments, the display control input includes a dedicated display control input.

In some embodiments, the dedicated display control input includes one of a switch, a knob, or a button.

In some embodiments, the display control input includes one of the simulated vehicle controls.

In some embodiments, the display control input includes one of a brake pedal, an accelerator pedal, a clutch pedal, a steering wheel, a horn button, a radio control, a siren control, or a transmission control feature.

In some embodiments, the computerized simulation control module further includes programming to selectively display and hide textualized feedback.

In some embodiments, displaying the untextualized feedback includes displaying to the driver one of a red indicator to indicate poor performance, a yellow indicator to indicate marginal performance, and a green indicator to indicate good performance.

In some embodiments, the computerized simulation control module further includes programming to provide a detailed analysis to the driver of the performance of the driver after the driving simulation is complete.

In some embodiments, displaying the untextualized feedback includes displaying to the driver a series of colored indicators to indicate to the driver whether the monitored performance passes each of the driving rules of the driving simulation, each colored indicator including one of a red indicator to indicate poor performance, a yellow indicator to indicate marginal performance, and a green indicator to indicate good performance.

In some embodiments, the computerized simulation control module further includes programming to provide a textualized feedback to the driver related to each of the colored indicators after the driving simulation is complete.

In some embodiments, displaying the untextualized feedback includes displaying to the driver a customized graphic indicator.

In some embodiments, the computerized simulation control module further includes programming to display false graphic indicators to confuse third-party onlookers.

In some embodiments, displaying the untextualized feedback includes displaying to the driver a graphic indicator upon a display screen configured to permit a viewer from only one direction to see the screen.

In some embodiments, the computerized simulation control module further includes programming to provide an audio indicator conveying to the driver one of poor performance indicator and a good performance indicator.

In some embodiments, the computerized simulation control module further includes programming to generate a vibration output to a cellular phone of the driver, the vibration output conveying to the driver one of poor performance indicator and a good performance indicator.

In some embodiments, the computerized simulation control module further includes programming to connect the driver through an audio communication with a randomly selected, anonymous driving instructor.

In some embodiments, the driving rules are a combination of generic driving rules configured to universal driving standards and local standard operating procedures for a particular locale.

According to one alternative embodiment, a driving simulation system configured to train a driver is provided. The system includes a simulated driver cockpit, which includes simulated vehicle controls and at least one video display providing a simulated driving environment to the driver. The system further includes a computerized simulation control module including programming to operate a driving simulation through the simulated driver cockpit. The driving simulation includes driving rules. The computerized simulation control module further includes programming to monitor performance of the driver during the driving simulation, compare the performance of the driver to the driving rules, and generate an untextualized feedback regarding performance of the driver relative to the driving rules. The computerized simulation control module further includes programming to monitor an input by the driver to a display control input, wherein the display control input includes one of the simulated vehicle controls and selectively display and selectively hide the untextualized feedback to the driver based upon the input by the driver to the display control input. The selective display is operable to enable private viewing of the untextualized feedback by the driver.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

One or more embodiments will now be described, by way of example, with reference to the accompanying drawings, in which:

FIG. 9 illustrates an exemplary event log that can be used to generate a result summary display screen as is illustrated in FIG. 2, the event log illustrating a plurality of milestones, evaluations made for each of the milestones, and a red, yellow, or green rating provided for each milestone, in accordance with the present disclosure;

DETAILED DESCRIPTION

Figure 1:
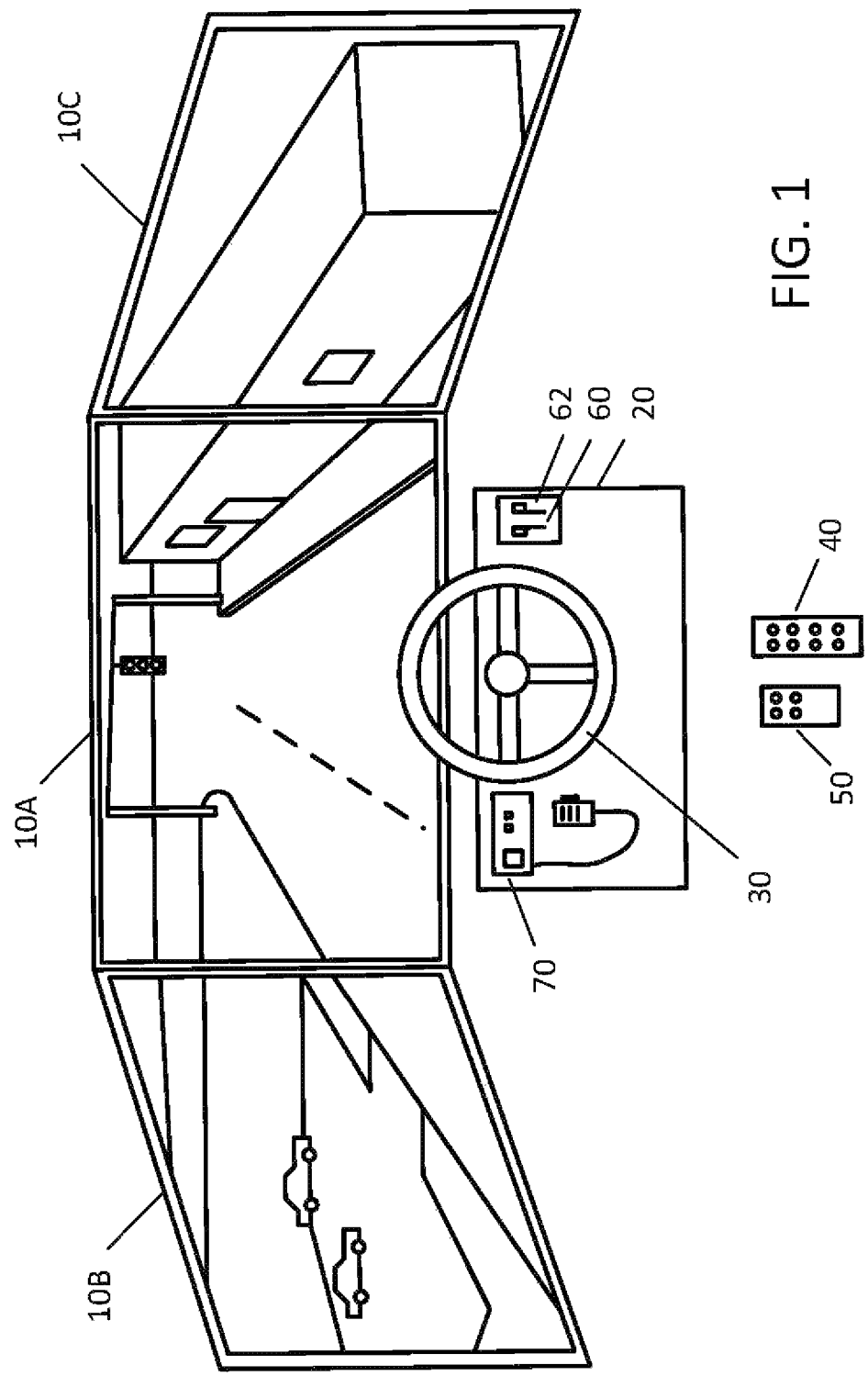
FIG. 1 illustrates an exemplary emergency responder driver training system, in accordance with the present disclosure.

A driver training system is disclosed. The system is computerized and includes input and output devices configured to provide the student or trainee with a realistic environment in which to train. The system can include a wide variety of different training fields, for example, training emergency responder drivers such as police, firemen, and ambulatory servers. The system can include training unskilled or novice drivers in any driving discipline (normal driving, motorcycles, professions that require specialized skills.) The system can enhance the skills of already experienced drivers. In another example, a bus driver simulation can be operated. In another example, a military vehicle or national guard driver simulation can be operated. In another example, a commercial driver or truck driver simulation can be operated. In any of the aforementioned fields, driver operation can require detailed knowledge of driving rules, for example, including speed limits under normal circumstances, speed limits in emergencies or pursuit situations, speed limits with and without emergency lights and/or an audible siren in operation. Successful operation of the vehicle, safety, compliance with local regulations, and career success of the driver can all depend upon the trained driver understanding and adequately following the rules.

Some driving rules are national or universal. Some rules are passed and enforced on a state level. Some driving rules are passed and enforced on a city, town, township, county, district, borough, or precinct level. Some driving rules are developed for a particular department or subdivisions within a department. Some rules are developed by a particular supervisor, and depending upon the supervisor on duty that shift, the driver may be responsible for the rules of that particular supervisor. The disclosed system provides customizable, selectable rule sets and rule sets that can change through a single simulation as the driver changes simulated position within the training. For example, upon crossing a county line within the simulation, the rules may change within the simulation. In another example, upon entering airport property or a school parking lot, rules may change. In another example, an average traffic stop can turn into a high-speed chase in a simulation, and rules of engagement can change as a result of the emergent condition within the simulation. In another example, if in the simulation, an active shooter situation has been identified, an entirely different set of rules for police officer trainees can apply. Such an emergent condition can be selected as a parameter or randomly activated during simulation exercises.

An exemplary embodiment of a scoring system for the disclosed simulation can include three main parts. In an exemplary first part of scoring, an application library which is fed data from the main simulation application. A scoring library uses this data, along with a scenario-specific set of rules (scoring data), to measure a student's performance for that scenario's objectives. An objective for a scenario could include use of EM lights during a pursuit, use of a turn signal, use of seatbelt, clearing particular intersections in a safe way, safety protocols such as ending a pursuit when that pursuit is unsafe for by-standers, as well as many others. In the parlance of scoring, those objectives are called "Scored items". A Scored item consists of several possible outcomes (ways that the student could possibly perform the objective) as well as a numerical score associated with each outcome.

The way in which a student completes an objective determines which numerical score they are given. Additionally, each scored item will produce a verbal description of what the student did to achieve that score as well as a description of what the student ought to have done (both of these are visible to the student/instructor/class via the scoring review software). Scored items are the basic building blocks of the scoring software and each scored item contributes to the overall score. Each scored item is also assigned a weight. The weight of a scored item determines how much a scored item's score contributes to that student's overall score for the scenario. For example, a collision's score ought to contribute far more to the final score than a failure to signal.

In an exemplary second part of scoring, scoring review software or programming interprets the results of a student's performance. This can be used in an online mode (during a scenario) as well as offline (after a scenario has completed). After a scenario has been run to the instructor's satisfaction, they will perform a replay. When the replay begins, a semi-transparent overlay will launch automatically on any of the student's displays and occupy the top third of that screen. Since the scoring review software is a distributed application, it is also possible to launch the scoring review software on the IOS (or any other computer on the system). What's more, one may launch the same software on any internet enabled device (exemplary smart phone or tablet/laptop etc). Simply connect to the system's wireless network. Once connected, simply visit a linked website on the device. No apps need to be installed. Once the instructor has finished, he or she will end the scenario. Once ended, a summary window will pop up.

The disclosed system can include the following features: numerical and non-numerical scoring modes, review software will run on any computer and can be run on multiple simultaneously (including smart phones), scenario control from within the scoring review software, realtime score editing (during a scenario or after), score edits can be tracked and require an instructor's comment, reports side-by-side scenario comparison for a student, student's progress through curriculum, tailored verbal description of each scored item (e.g., a recorded summary of what did the student do to earn the score), a timeline including milestones passed within the simulation and performance of the student at each milestone. A timeline gives the instructor and/or the trainee a view of problematic parts of the scenario. At a glance, the instructor can see where the problems occurred, click on that piece of the timeline, and have the opportunity to edit or jumpback the time the score occurred for a more efficient review.

In one exemplary embodiment, during a replay, each of the events in the timeline is accentuated for three seconds before the event until one and a half seconds afterwards. This allows the instructor enough time to see that the student is about to do something in the replay. It also gives the instructor the ability/time to be prepared to properly instruct the trainee driver based upon the viewed performance.

The purpose of the scoring library is to provide architecture-independent, scenario-based scoring. The library can have a simple and flexible API (Application Programming Interface) and all the data needed to drive it can be updated and changed with little or no impact on the library. All data needed by the library can be stored in a map keyed by name.

The scoring library uses an event-driven architecture. There is a mediator class which is the executive portion of the library. External modules interact with the library as well as with other modules (more on modules in the extension section) through the mediator by raising or consuming events. Specifically, external modules will interact with the MediatorInterface class.

There is a ScoreProcessor class which is responsible for constructing and aggregating the Scored items for a scenario as well as calling their DoScoring methods every update.

There is a Configurator class which is responsible for parsing the Config xml file and distributing that config data to the various library components and modules via the EVENT_PERFORM_CONFIG_E event.

A Score Processor is a built-in component of the library which manages scored items and provides them with the data necessary to do scoring. The Score Processor stores a std::vector of ScoredItems (ScoredItem.h). In the Score Processor's Update Event handler, each ScoredItem has its DoScoring method called. After the DoScoring call, the processor decides if the student driver has completed their scoring task, and if so raises an event indicating that such is the case and providing the details as event data.

The fundamental unit for scoring is called a scored item. A scored item can be thought of as a particular task which can be carried out in a variety of different ways each corresponding to a different score. As an example, a scored item could be an emergency vehicle's clearing an intersection. In this example, a scenario creator may force a decision to be made as to which lane the vehicle clears the intersection in. There can be a multitude of possibilities, each having a different score associated with it, offering more than simply pass/fail. Scored items are defined in XML inside the scores.xml file. The location of that file for a given scenario is provided in the config xml file. These ScoredItems are constructed in ScoredItemFactory.cpp.

Each Scored item has one or more score classes associated with it. A score class aggregates tests and has an associated numerical score. During DoScoring, each Score's IsTrue method is called. This will return true if each of the Tests which the Score object aggregates is true simultaneously. If IsTrue returns true, the ScoredItem's overall numerical score then becomes that of the particular Score.

Each Score contains one or more score tests. A Score test is a class which compares data passed into the library with anticipated values defined in xml. An example of a score test is a RegionTest. A RegionTest will return true if the "ownshipLocation" value (given as update data) lies within a polygon described by a std::vector of vertices. Another example is a vehicle's emergency lights being in a particular state. These tests can be combined in Score objects to test a myriad of different combinations of simulation attributes.

There are a few extensions of the ScoreTest base class. There are generic classes such as numerical range tests which can be applied to a broad range of inputs; a majority of tests will utilize this class. As the name implies, it tests a piece of update data for inclusion in a defined range. Similarly, there is a Boolean test. There are a small number of specialized tests as well. These tests need to use algorithms that do more complex things. Region test and Path test are both examples where algorithms are only useful in specialized cases and are tailored specifically for testing point in a polygon and point near a line segment respectively.

In one embodiment, to support other platforms, the tests needed to be generalizable. For example, military products would use completely different tests from commercial products. To solve this, adding a new test is as simple as adding one line to the implementer's code. For example, to add the ability to test the third derivative of displacement in a scoring test, one would add the following:

UpdateData→AddUpdateData("ownshipJerk",vehDynamicsData.jerk);

Now the range test needs simply to look inside of update data for a value with name "ownshipJerk" to test against it. It will know to do so from the xml definition of the scored items for the scenario.

In one embodiment, configuration of score tests is done using an xml file which will be described here briefly, but which is more thoroughly described by its schema. In this file there is a <Data/> section which defines regions and paths. This data can be referenced elsewhere using the UUID (universally unique identifier.)

Scored item attributes can include the following exemplary characteristics or traits: UUID: uniquely identifies the scored item globally; Name: this is a user-facing identification of the scored item; Weight: This is used in computation of overall scenario's score. It determines how much a scored item's points contribute to the final score; TimeLimit: If non-zero, this is the total amount of time the student has to achieve a score. Timer starts when the scored item becomes active; InitialPoints: The numerical score the student starts with; DefaultScore is the score achieved if the Scored item is activated, but no particular score is achieved; MaxNumberOfScores: How many deductions (or increments) the student can achieve if the scoring method is set to INCREMENTAL_SCORE_E; CommentRequired (this can be used to communicate to the front-end software that an instructor must comment on a scored item—this is not enforced by the library in any way—instead, the front-end software should be made to enforce it); Debug: This causes logs every update; Method: Often it is possible to attain several scores while the scored item is active.

Scoring Method tells the library how to decide which of those scores to keep. For example, if one wishes to enforce a low speed in a region, and the student uses a low speed for most of the region and then violates the speed restriction, the way to capture that behavior is by specifying that a preference for the lowest score. Otherwise, one would get the positive points associated with driving slow initially.

Scored item attributes can further include: HIGHEST_SCORE_E: Keep the highest score the student achieves; LOWEST_SCORE_E: Keep the lowest score the student achieves; LAST_SCORE_E: Keep the last score the student achieves; FIRST_SCORE_E: Keep the first score the student achieves; SEQUENTIAL_SCORE_E. In this configuration, each score consists of a step to perform. After each step is complete, the student may proceed to the next step accumulating points associated with each step (Score) along the way Scored item attributes can further include: INCREMENTAL_SCORE_E: Scored item can be scored MaxNumberOfScores times. (each score contributes to an overall score—this can be used in conjunction with InitialPoints to either start with points and deduct or start at zero and go up); It is noted that this operation may include providing a message from the scenario/scoring creator to the instructor. This message may be useful to convey the intent of the scored item so the instructor can better interpret the results; Activate. In one embodiment, Activate is similar to a score in that it aggregates tests. The difference is that this serves only to decide whether to perform this scored item's scoring. Only if this evaluates to true will the Score Processor call the Scored item's DoScoring method.

In one embodiment, the library has a built-in mechanism for handling configuration data called the Configurator. When the API is created, the file given as an argument to GetScoringAPI tells the library where to retrieve configuration data. All configuration data is stored as a key-value pair.

To extend the library, it is possible to create a module which can consume data produced by either the library or other external modules through event data. To do so, create a class which inherits from the abstract Module class (Module.h). The new module will override the HandleInitializeEvent and RegisterEventHandlers methods defined in the Module class. HandleInitializeEvent is where the module prepares itself for future scenarios in whatever ways are necessary. Before beginning a scenario, the various subcomponents of the library, as well as external components, will use the macro CREATE_EVENT_HANDLER (defined in EventHandler.h) as an argument to the MediatorInterface's RegisterEventHandler. This provides the Mediator with a callback mechanism to provide the module with the requested data as it is generated. Event handler registration ought to be done inside the class' implementation of RegisterEventHandlers since it is at this point that the Mediator is fully initialized.

In one embodiment, the primary means of communication internally as well as externally is through the raising of events. The benefit of this is that modules need only register their particular event handlers and declare their interest in events of a particular type in order to be integrated into the library. Doing so will instruct the library to provide that data with no modifications to the library itself. Events are raised via the MediatorInterface's RaiseEvent method. So, for example, a module wanting to use the library's built-in config data class can retrieve that data by creating a handler and registering it with the Mediator to be called for events of type EVENT_PERFORM_CONFIG_E. When the Configurator component of the library has finished reading the config data, it alerts all interested parties by raising an event of type EVENT_PERFORM_CONFIG_E. A module's handler will be called and supplied with the requested data in the form of const*EventData which can be cast to ConfigEventData.

RaiseEvent takes two arguments. The first is the event data itself, and the second is whether the event is to be processed immediately or whether the event should be added to the Mediator's event queue and processed during the next update. To avoid data synchronization issues, it is only possible to raise an event to be processed immediately from the main thread. If one asks the Mediator to do so, the Mediator will simply log that the attempt was made and add the event data to the queue and process during the next update.

The library provides a built-in mechanism for the event handlers to be executed in their own thread. This can be useful if the operation to be performed inside the handler will take too long or will last an indeterminate (at compile time) amount of time. As an example, commercial implementation of Scoring uses an SQL connection which can take dozens of milliseconds to connect and perform database operations which is often longer than the allowed frame time of the application implementing the library. To enable this feature for a particular event handler, simply supply a value of true as the final argument to the MediatorInterface's RegisterEventHandler method. Any interactions with the library or its modules are guaranteed thread-safe.

There is a log module which can be included with the scoring library. This module handles events of type EVENT_PUBLISH_LOG_E. Since these are events, logging in this way will be thread-safe. The output can be directed to one of three locations (console (stdout), syslog (on Linux), file)

using the config item "LogOutput" by specifying "console", "syslog", or simply giving the path to a file. Keep in mind that if one does not use an absolute path to a file, the current working directory will be that of the application. As an argument to the log event data, one will specify the loglevel. If a config value of "MinimumLogLevel" is specified, the log will be printed if the log level in the event exceeds that level. If that value is not set and "LogLevel" is, the log will be printed if ((eventLogLevel & LogLevel)==eventLogLevel).

All event data is supplied to the MediatorInterface in the form of EventDataSignature eventData which is a typedef for const EventData *. After the library is supplied with the event data object, responsibility for memory management of that object is given to the library.

For those creating an event handler, Event Data can be guaranteed valid only for the duration of a particular invocation of that handler. This is true for threaded handlers as well; the library will only delete the object once each handler has finished execution. As a result, any data one may wish to persist beyond the handler's lifetime should be stored elsewhere.

When scored items have been scored, the library raises an EVENT_PERFORM_PUBLISH_DATA_E event and provides a copy of the scored item (ScoredItem.h) as event data. This scored item object can then be used to obtain the score achieved, minimum score possible, maximum score possible, weight, name, notes, etc. By default, nothing is done with these events, and it is incumbent upon the implementer to store these results as well as interpret them. In FAAC's commercial implementation, there is a module called PostGreSQLDataPublisher which listens for those events and writes to a PostGreSQL database on the IOS computer.

The scoring library scores students based on specific training objectives. The library is given copious amounts of data about the simulation. All of this data can be used in concert to produce rich scoring information in a fair and repeatable way.

A Scored item is the most important component of the Scoring library; it represents a specific training objective. A Scored item is constructed of one or more possible numerical scores which the student could obtain. Each score has a collection of one or more criteria (tests). To obtain a particular score, the student must satisfy each of that score's tests simultaneously while the Scored item is active (more on activation later).

Each scenario can have multiple Scored items. Each Scored item can be scored only once in a given scenario.

Each Scored item has a special group of tests called the Activation Criteria. This group of tests is used by the library to decide whether or not the scored item is ready to be scored. These Activation Criteria are also used by the library to determine what to do at the end of a scenario if a Scored item has not yet produced a score.

A score consists of a single numerical value and a group of tests. The specifics of tests are detailed in the Tests section of this document. If a student satisfies each of the tests in a particular Score (simultaneously), and if the scored item is active, the student receives that Score's numerical value as the final score for the scored item.

Basically, anything that is measurable by the main simulator application can be used in the scoring library as a test. Tests can include cab I/O data, vehicle dynamics data, simulator environment data (time of day, fog, etc), as well as many others.

Any score test can be inverted. When inverted, a test that would return true will now return false and vice versa. As an example where one may want to use this is testing that the windshield wipers are ON. Since windshield wipers have at least 2 on states (low and high) one may either test that (wipers are in low OR wipers are in high) or one may do the simpler test of (wipers are off) and invert it. You're essentially just saying wipers are NOT OFF Testing results can be mapped in polygon plots. Region tests are tests that return true when the student's ownship is inside of a simple polygon. A simple polygon is one where no two sides cross.

In the event that the student does not earn any score for a scored item, that scored item will be marked as incomplete unless Default Points is set in which case the default points are awarded.

Referring now to the drawings, wherein the showings are for the purpose of illustrating certain exemplary embodiments only and not for the purpose of limiting the same, FIG. 1 illustrates an exemplary emergency responder driver training system. At least one display screen is provided upon which a graphical representation or rendering of a virtual driving environment is provided upon the screen. In the exemplary embodiment of FIG. 1, screen 10A is provided for a front view of the trainee, and screens 10B and 10C are provided to give left and right views, respectively, for the trainee. A control panel 20 is provided including a steering wheel 30, an accelerator pedal 40, a brake pedal 50, siren control switch 60, emergency (EM) light control switch 62, and emergency radio 70. It will be understood that these details of FIG. 1 are exemplary and would change based upon the driver profession or vehicle being simulated. Other controls could include turn signals, emergency brake, police computer, mapping display (GPS), bus door controls, gear shift, rear view simulation screen, and other similar controls. All of the simulation input and outputs can be controlled by a computerized processor operating programming configured to provide the trainee with a visual representation of the driving environment, process inputs by the trainee, and track/generate progress of the trainee through the simulation including scoring as described herein.

In one embodiment, the illustrated system can include one or more cameras watching the driver, for example, to determine hand gestures, determine gaze location, determine verbalizations, etc. for additional scoring and training options.

Figure 2:
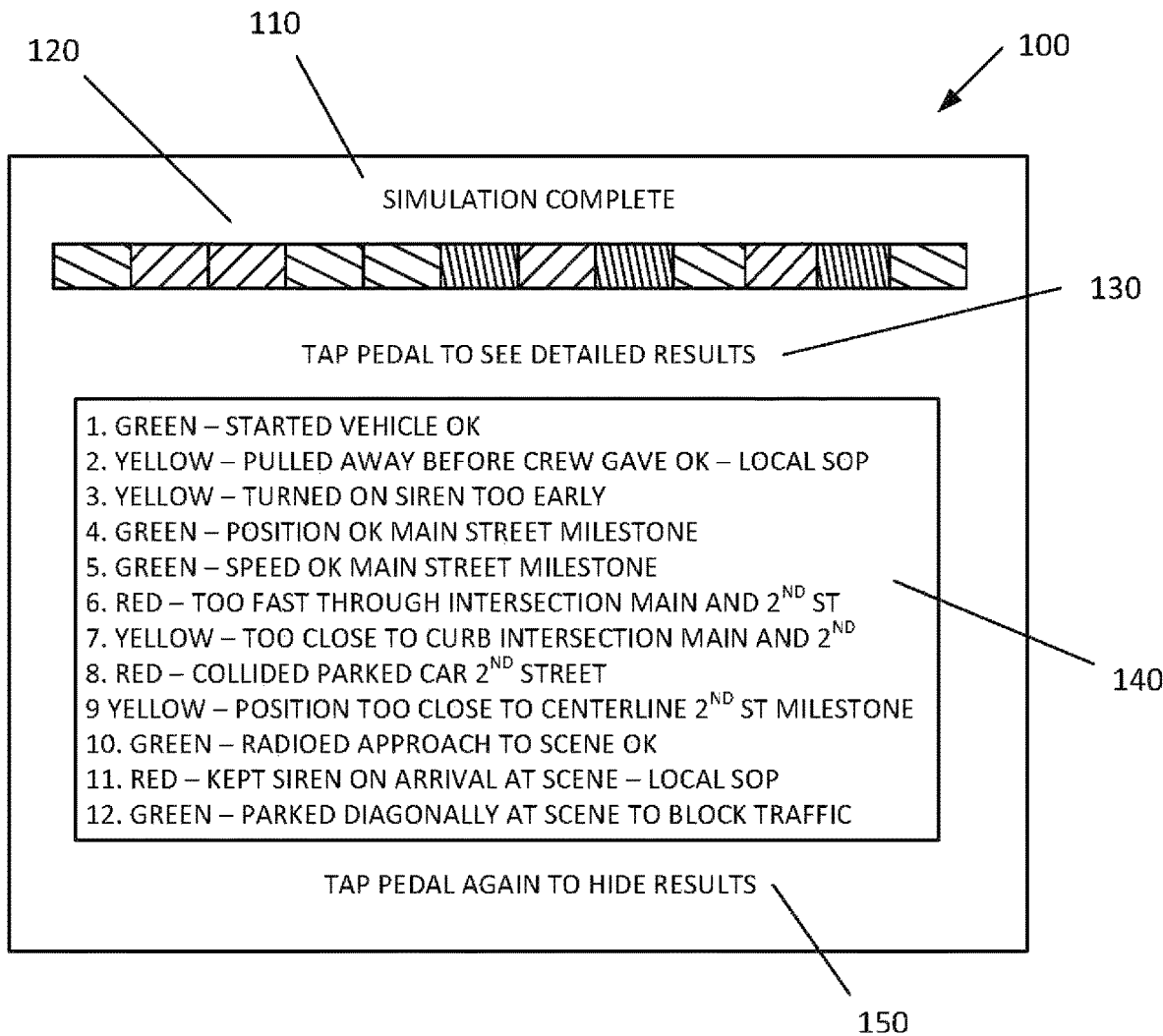
FIG. 2 illustrates an exemplary result summary display screen that can be provided by the driver training system of FIG. 1 at the conclusion of a driving simulation, in accordance with the present disclosure.

FIG. 2 illustrates an exemplary result summary display screen that can be provided by the emergency responder driver training system of FIG. 1 at the conclusion of a driving simulation. Display screen 100 includes banner 110 and unlabeled results color bar 120.

Driver compliance and willingness to work with training programs can be partial or reluctant. Drivers, in particular, established drivers that have a job and do not want excessive scrutiny, can resist use of trainers or simulations that generate results that can be tracked, printed, tabulated, and be used to criticize the driver. However, such drivers can still develop bad habits. Such drivers still face new equipment or updated technology. Such drivers still face new laws and regulations that impact accepted practices. For a wide range of reasons, trained and experienced drivers can still benefit from the use of driving simulators. According to one class of embodiments of the present disclosure, a system is disclosed which provides for private or restricted viewing of test results by the trainee. By not publishing the results to management, instructors, or onlookers, a group of trained and professional drivers can be encouraged to use the simulator, with the driver being provided results and benefitting from instruction without facing institutional criticism. In one embodiment, a group of drivers can permit the system to publicly or semi-publicly rank the drivers to increase competition between the drivers without publishing detailed performance to anyone but the individual drivers. In another embodiment, a remote server can provide drivers with an opportunity to receive randomized, remote instruction by a trained professional without any identification being provided to either party—in this way the driver can receive instruction without feeling stigmatized or judged by someone that knows the driver outside of the simulation.

Unlabeled results color bar 120 can be displayed during or after a simulation, with onlookers being able to see what percentage of the scoring of the driver is green (complying), yellow (partially complying), or red (non-complying) with the rules of the simulation. Prompt 130 enables the driver to use an exemplary pedal input to see private, detailed test results 140. Prompt 150 enables the driver to quickly hide the results when desired.

Figure 3:
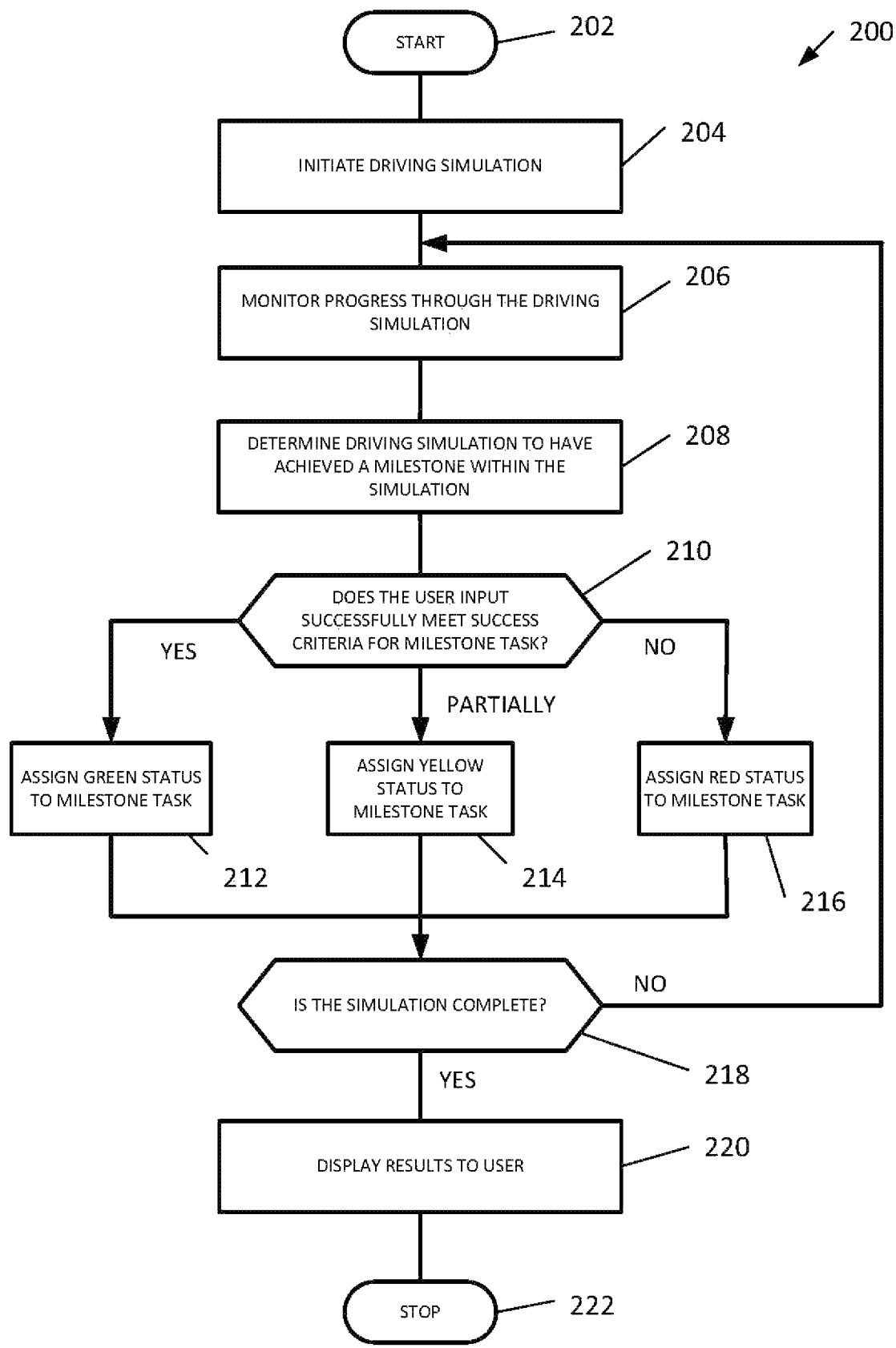
FIG. 3 illustrates through a flowchart an exemplary process to operate a driving simulation, in accordance with the present disclosure.

FIG. 3 illustrates through a flowchart an exemplary process to operate a driving simulation. Exemplary process 200 is provided and starts at step 202. At step 204, the driving simulation is started. At step 206, the system monitors progression of the driver through the simulation. At step 208, the system determines that the driver has achieved a milestone within the simulation. A milestone can be many different occurrences, for example, reaching a particular location on a road, reaching a particular speed, activating a piece of equipment, making a call on a radio, etc. At step 210, success for a rule or scoring item for the simulation is determined. If user inputs achieve success for the rule or scoring item, the process proceeds to step 212 where a green status is assigned to the milestone. If user inputs partially achieve success for the rule or scoring item, the process proceeds to step 214 where a yellow status is assigned to the milestone. If user inputs fail to achieve success for the rule or scoring item, the process proceeds to step 216 where a red status is assigned to the milestone. At step 218, the process determines whether the simulation is complete. If it is not complete, the process returns to step 206. If the simulation is complete, the process advances to step 220 where results are displayed to the user. At step 222, the process ends. Process 200 is exemplary, many variations of the process are envisioned, and the disclosure is not intended to be limited to the examples provided herein.

Figure 4:
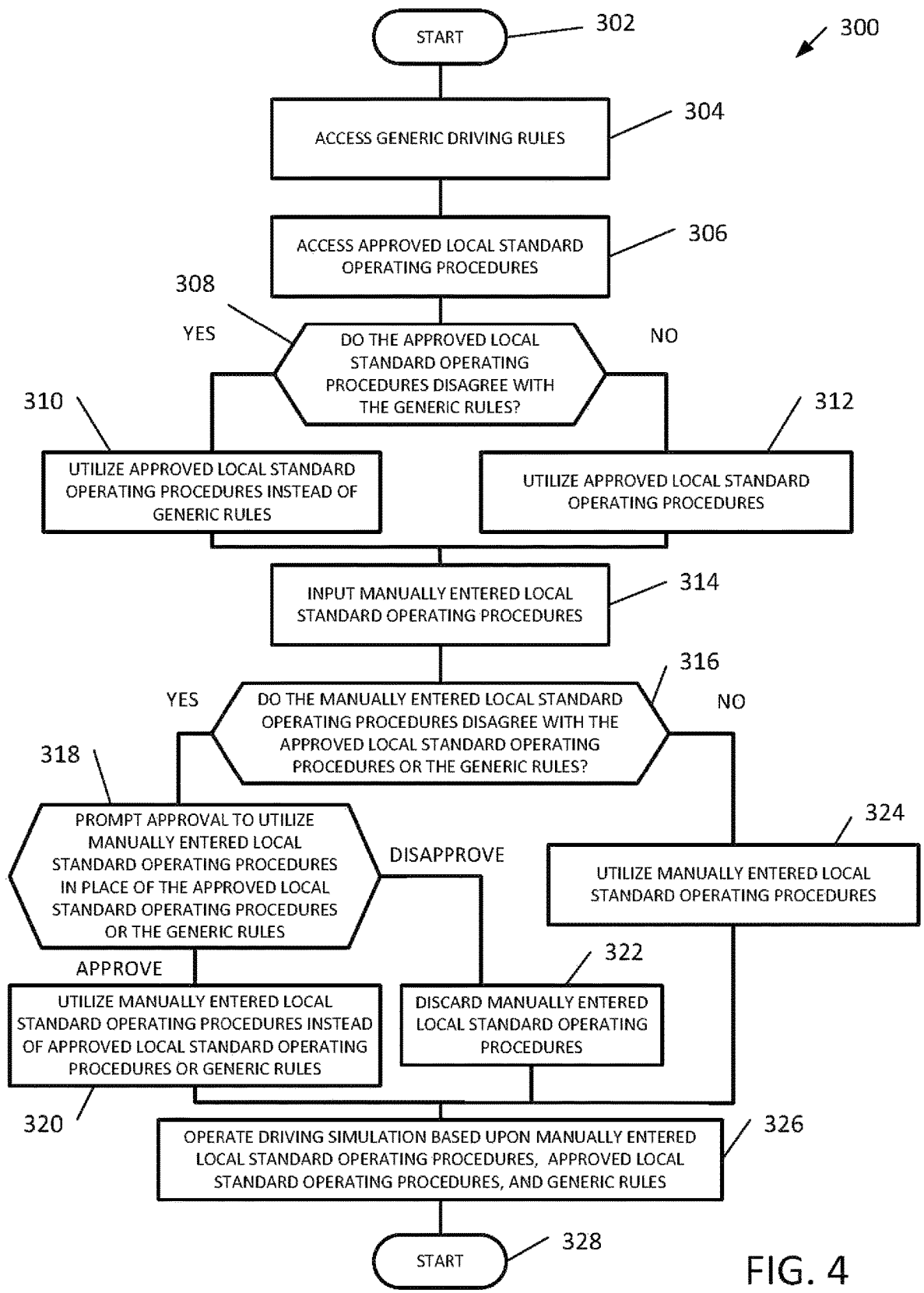
FIG. 4 illustrates through a flowchart an exemplary process to utilize local standard operating procedures and selectively prioritize the local standard operating procedures over generic driving rules, in accordance with the present disclosure.

Simulations described herein can use standard or generic rules, for example, created at a central location and either stored on a central server or provided with the software for the disclosed system. Such generic rules can be used in isolation, for example, to train truck drivers that drive in many states upon Interstate freeways that have largely standardized rules and do not have a use for specific state laws. However, police and other emergency responders have highly particularized rules that can change over time and depending upon where they are. FIG. 4 illustrates through a flowchart an exemplary process to utilize local standard operating procedures and selectively prioritize the local standard operating procedures over generic driving rules. Exemplary process 300 starts at step 302. At step 304, generic driving rules are accessed or downloaded. At step 306, the system accesses a list or library of approved local standard operating procedures. These approved local standard operating procedures can be based upon state or local rules adopted as a result of laws, regulations, or government or leadership preferences. At step 308, the process determines whether the local procedures from step 306 disagree with the generic rules. If the local procedures do not disagree with the generic rules, the system advances to step 312 where the local procedures are adopted in addition to the generic rules. If any of the local procedures disagree with the generic rules, the process advances to step 310 where the local procedures are adopted in place of the generic rules. At step 314, the system permits a user or instructor to manually enter or select local standard operating procedures. At step 316, the system determines whether the manually entered standard operating procedures disagree with the already adopted rules and procedures. If they do not disagree, the manually entered procedures are adopted at step 324. If they do disagree, a prompt is provided at step 318 to approve or disapprove the manually entered procedure in favor of the already adopted rule or procedure. A prompt may be for the purpose of identifying for the user that a manually entered procedure is inaccurate. The prompt may be to an instructor, causing the instructor to research which procedure is the more accurate representation of the real-world rules. The prompt may provide local leadership with a mechanism to stop bad habits from being adopted by users manually entering unapproved procedures. If the prompt results in the manually entered procedure being approved, the manually entered procedure is adopted at step 320 in favor of the previously entered rule or procedure. If the prompt results in the manually entered procedure being disapproved, the manually entered procedure is discarded at step 322. At step 326, the simulation is operated based upon the adopted rules and procedures of the process. At step 328, the process ends. Process 300 is exemplary, many variations of the process are envisioned, and the disclosure is not intended to be limited to the examples provided herein.

Figure 5:
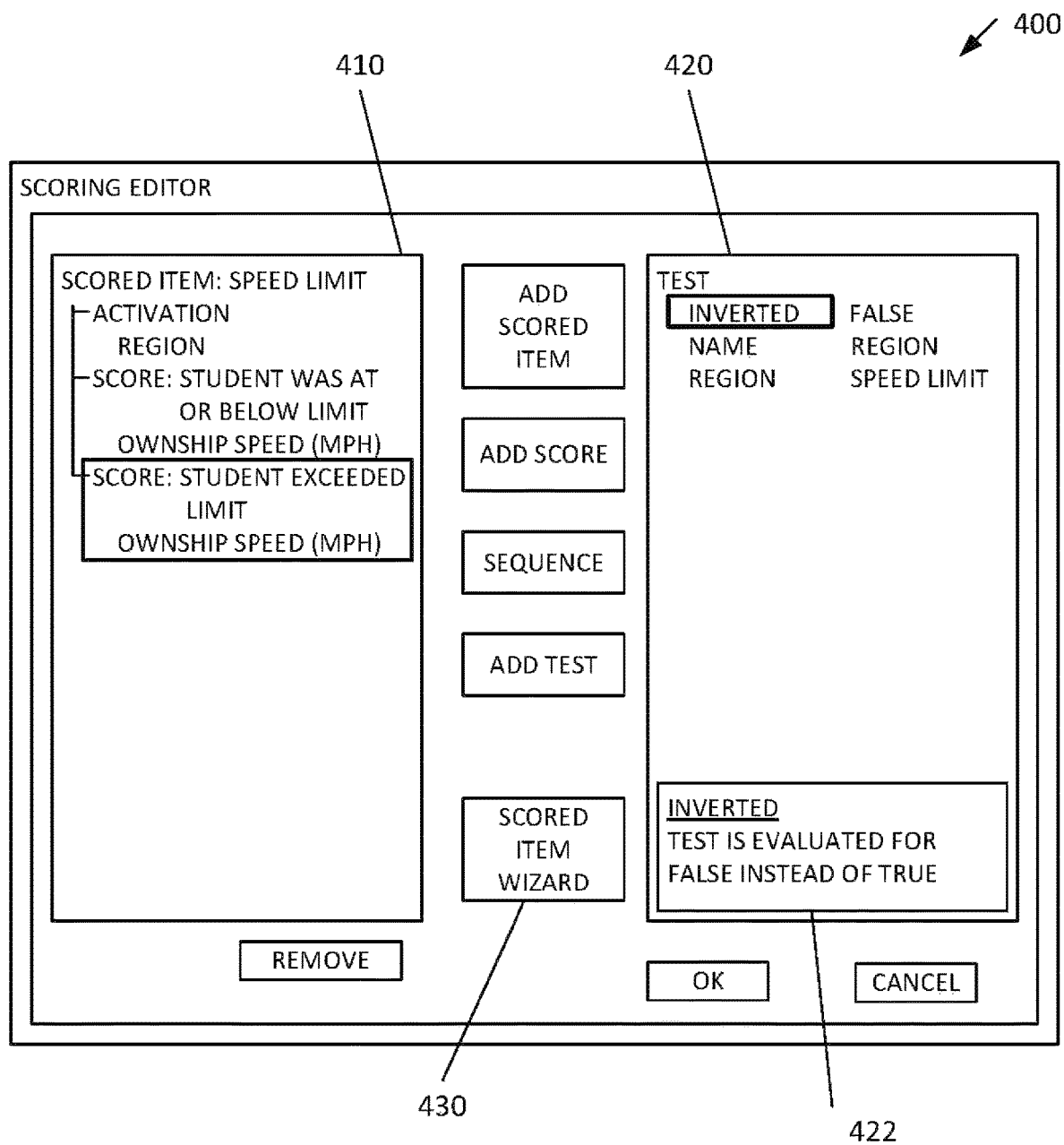
FIG. 5 illustrates an exemplary scoring editor useful to set scoring criteria in a driving simulation, in accordance with the present disclosure.

FIG. 5 illustrates an exemplary scoring editor useful to set scoring criteria in a driving simulation. Screen 400 is illustrated, providing a user with an ability to reference candidate scored items in area 410. In the exemplary display of FIG. 5, candidate scoring items are provided in relation to the driver's simulated speed. In area 420 of screen 400, options are provided for selection of the candidate scoring item. Panel 422 provides a description of a selected aspect of the test, providing the user with definitions of the items being configured. Various buttons or controls are provided for selecting, sequencing, and tuning the scoring items being configured. An optional scoring item wizard 430 is provided, which can take a user step by step through a process to set up a sequential list of scoring items tied to milestones in a simulation.

Figure 6:
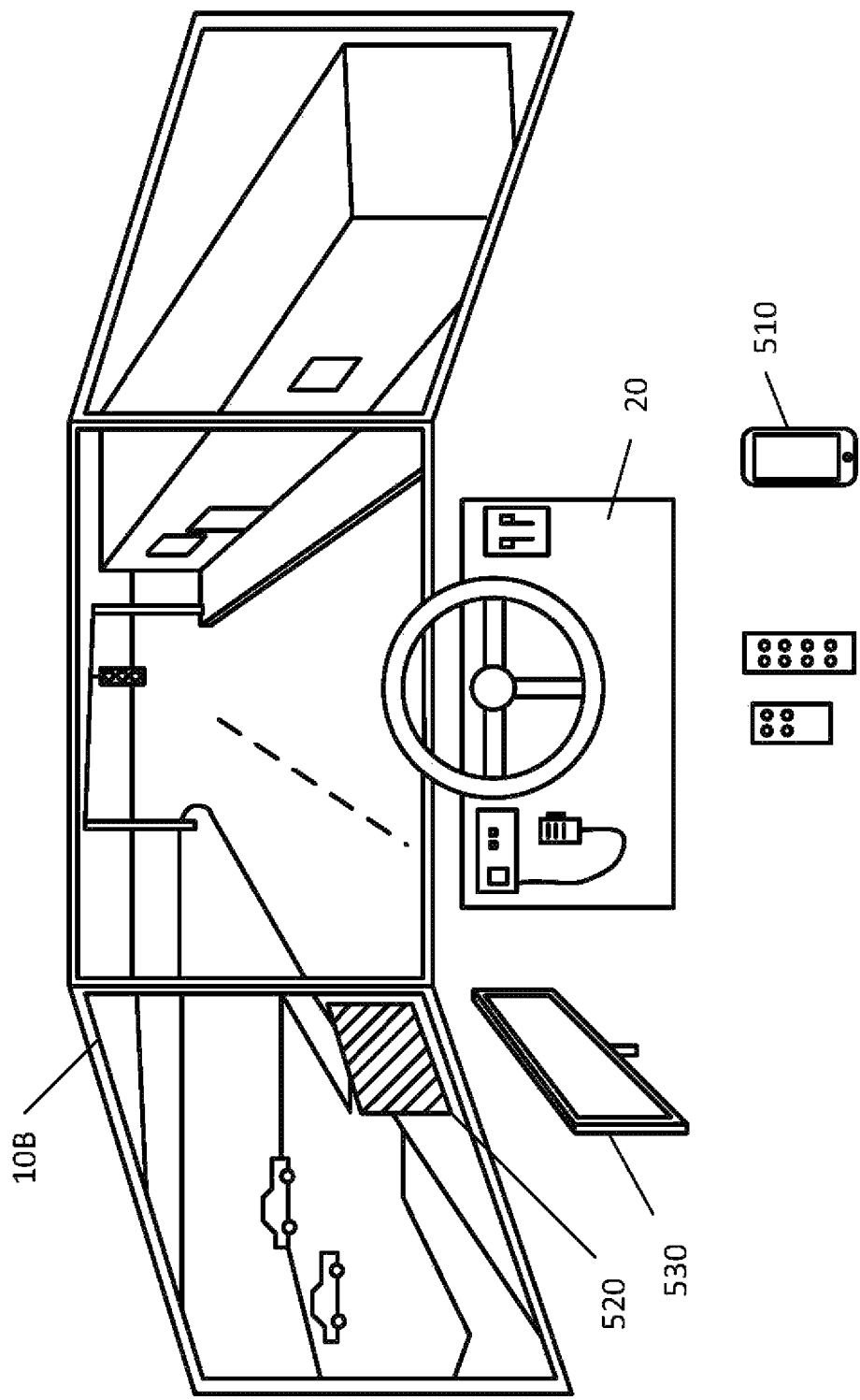
FIG. 6 illustrates the emergency responder driver training system of FIG. 1, including a plurality of result indication devices, in accordance with the present disclosure.

FIG. 6 illustrates the emergency responder driver training system of FIG. 1, including a plurality of result indication devices. Results for a driving simulation can be displayed on any display. If the results are to be publicized or published, they can be output to any known device, computerized system, website, remote server, or other data handling process. If results are intended to be private for the driver or nearly private, a number of outputs can be used. For example, console 20 is illustrated including the plurality of view screens including screen 10B. Results can be displayed upon any portion or an entirety of any screen. Exemplary portion 520 is illustrated wherein a result screen such as is illustrated in FIG. 2 can be displayed. A separate result view screen 530 can be additionally or alternatively utilized. In one embodiment, a specialized view screen that includes prismatic or other details upon the view screen only permit a viewer from one direction to see the screen while others attempting to view the screen from other directions or angles cannot see the screen. By using such view screen, the driver can see his or her results without other viewers in the area being able to see the results. Smart phone 510 is additionally illustrated. In one embodiment, a dedicated application in the phone can be synced with the operation of the simulation so that the driver can get details on his or her phone. In another embodiment, the results can be emailed to the driver. In another embodiment, a feature through or similar to Snapchat® can be utilized, where a message including results can be sent to the driver, and those results are deleted once they are viewed for some time such as 15 seconds. The devices upon which results can be delivered to the driver or to others are provided as examples, and the disclosure is not intended to be limited to the particular examples provided herein.

Figure 7:
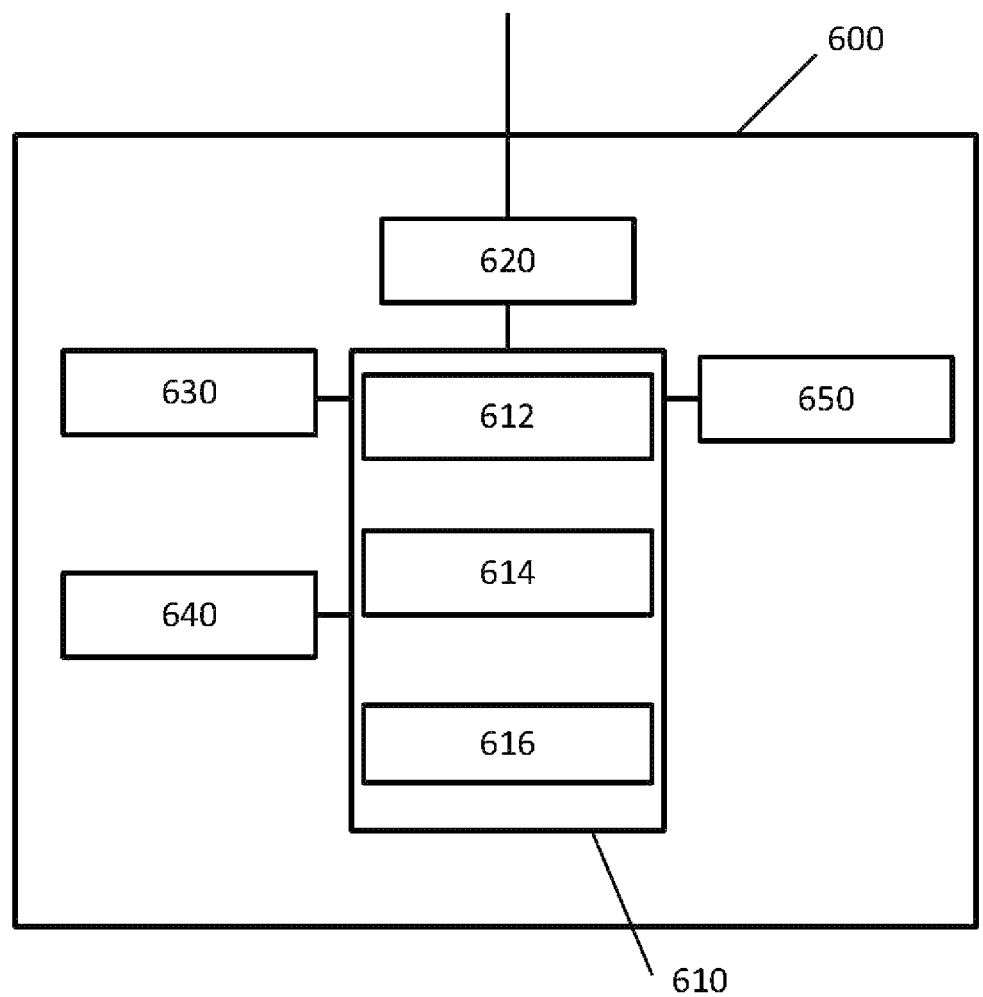
FIG. 7 illustrates an exemplary computerized device configured to operate the disclosed driving simulation on the exemplary emergency responder driver training system of FIGS. 1 and 6, in accordance with the present disclosure.

FIG. 7 illustrates an exemplary computerized device configured to operate the disclosed driving simulation on the exemplary emergency responder driver training system of FIGS. 1 and 6. Computerized device 600 is illustrated, including processor device 610, durable memory storage device 650, communication device 620, input devices 630, and output devices 640.

Processor device 610 includes a computing device known in the art useful for operating programmed code. Device 610 includes RAM memory and can access stored data through connection to memory storage device 650. Memory storage device 650 includes any hard drive, flash drive, or other similar device capable of receiving, storing, and providing access to digital data. Memory storage device can include any user data, map data, rules and procedures data, scores and results data, and any other data necessary to operate the disclosed simulations.

Processor device 610 includes programming modules including driving simulation module 612, rules and procedures module 614, and scoring module 616 which represent programmed functions that are exemplary of processes that can be carried out within processor device 610 but are intended to be non-limiting examples of such processes. Driving simulation module 612 includes programming and data configured to operate the described driving simulation, render graphics required to create the images of the driving environment, coordinate driver inputs to the control mechanisms to simulate movement of the vehicle through the simulated driving environment, and simulate operation of other systems in the simulation including sirens and radios. Rules and procedures module 614 includes programming to coordinate all related driving and vehicle operation rules and procedures that are used to test the driver. In addition, module 614 can include programming to simulate any emergent conditions and modulate scoring based upon the emergent conditions. Scoring module compares simulated operation of the vehicle with the rules and procedures, manages milestones and other judgment criteria, and provides the results output used to instruct the driver. Modules 612, 614, and 616 can include any related programming and related processes and are intended only as non-limiting examples of how the system could be configured.

Input devices 630 include any devices or mechanisms useful to receive driver and instructor input to modulate operation of the simulation and can include but are not limited to simulated steering wheels, pedals, switches, levers, cameras, a mouse and keyboard, microphones, and a simulated radio.

Output devices 640 include any display screens, simulated sirens, simulated EM lights, simulated radio, data output devices, vibrating seats or vibrating steering wheels necessary to provide output to the driver or instructor.

Communication device 620 includes any wired or wireless communication system required to send and receive data from the computerized device.

Figure 8:
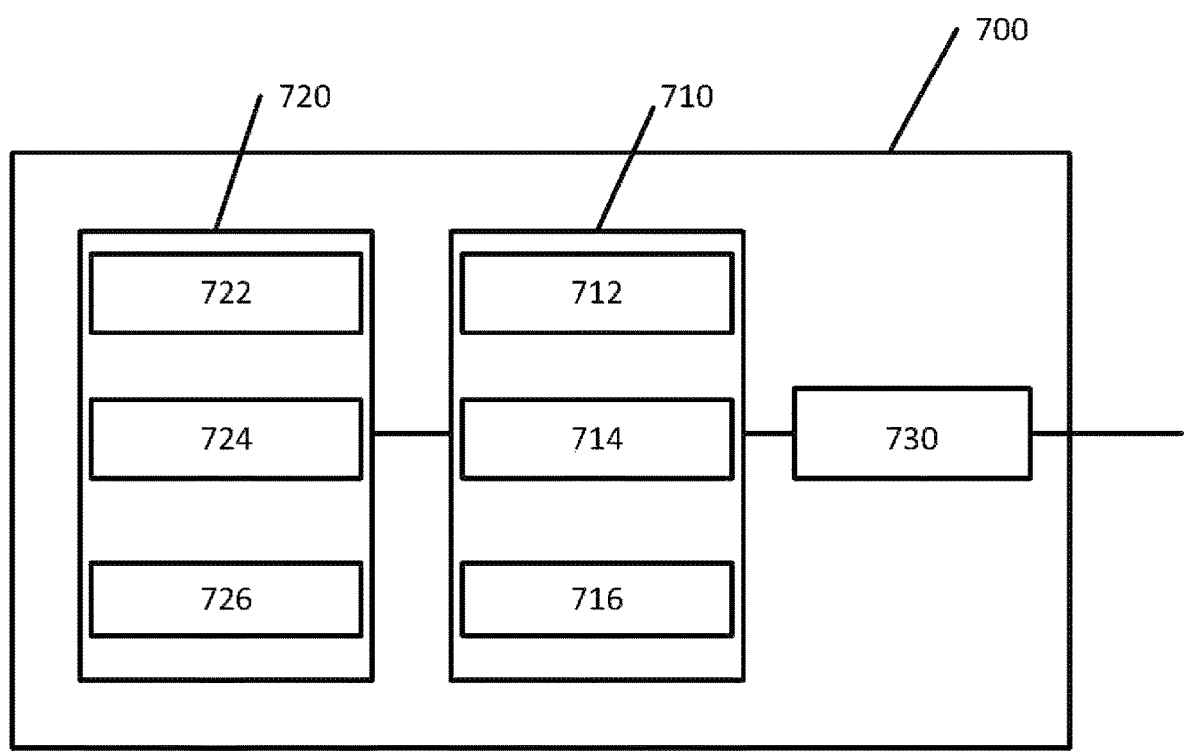
FIG. 8 illustrates an exemplary computerized device configured to operate as a server for the disclosed systems and processes, providing support in terms of data, driving rules, maps, and instructional programming and interactions, in accordance with the present disclosure.

FIG. 8 illustrates an exemplary computerized device configured to operate as a server for the disclosed systems and processes, providing support in terms of data, driving rules, maps, and instructional programming and interactions. Computerized remote server device 700 is illustrated, including processor device 710, durable memory storage device 720, and communication device 730.

Processor device 710 includes a computing device known in the art useful for operating programmed code. Device 710 includes RAM memory and can access stored data through connection to memory storage device 720. Memory storage device 720 includes any hard drive, flash drive, or other similar device capable of receiving, storing, and providing access to digital data. Memory storage device can include a user data, map data, rules and procedures data, scores and results data, and any other data necessary to operate the disclosed simulations. In particular, storage device 720 includes customer library 722 include account information for different users that subscribe to the system; maps, rules, and procedures library 724 providing downloadable resources for users operating the system; and simulation and scoring resources library 726 providing libraries of information for running a simulation, including simulated vehicle handling data, scenario data that can operated remotely, and pre-staged test conditions for operating test simulations for generic customers.

Processor device 710 includes programming modules including driving simulation support module 712, rules and procedures support module 714, and scoring support module 716 which represent programmed functions that are exemplary of processes that can be carried out within processor device 710 but are intended to be non-limiting examples of such processes. Modules 712, 714, and 716 can include programming configured to assist operation of corresponding functions in related customer computerized devices.

Communication device 730 includes any wired or wireless communication system required to send and receive data from the computerized server device.

FIG. 9 illustrates an exemplary event log that can be used to generate a result summary display screen as is illustrated in FIG. 2, the event log illustrating a plurality of milestones, evaluations made for each of the milestones, and a red, yellow, or green rating provided for each milestone. The exemplary events, milestones, evaluations, and ratings are provided as examples of test criteria that can be used to generate results. The milestone column includes descriptions of generic rules and a plurality of "STATE SOP" and "LOCAL SOP" milestones which can be used in generating test results for a particular driver.

Figure 10:
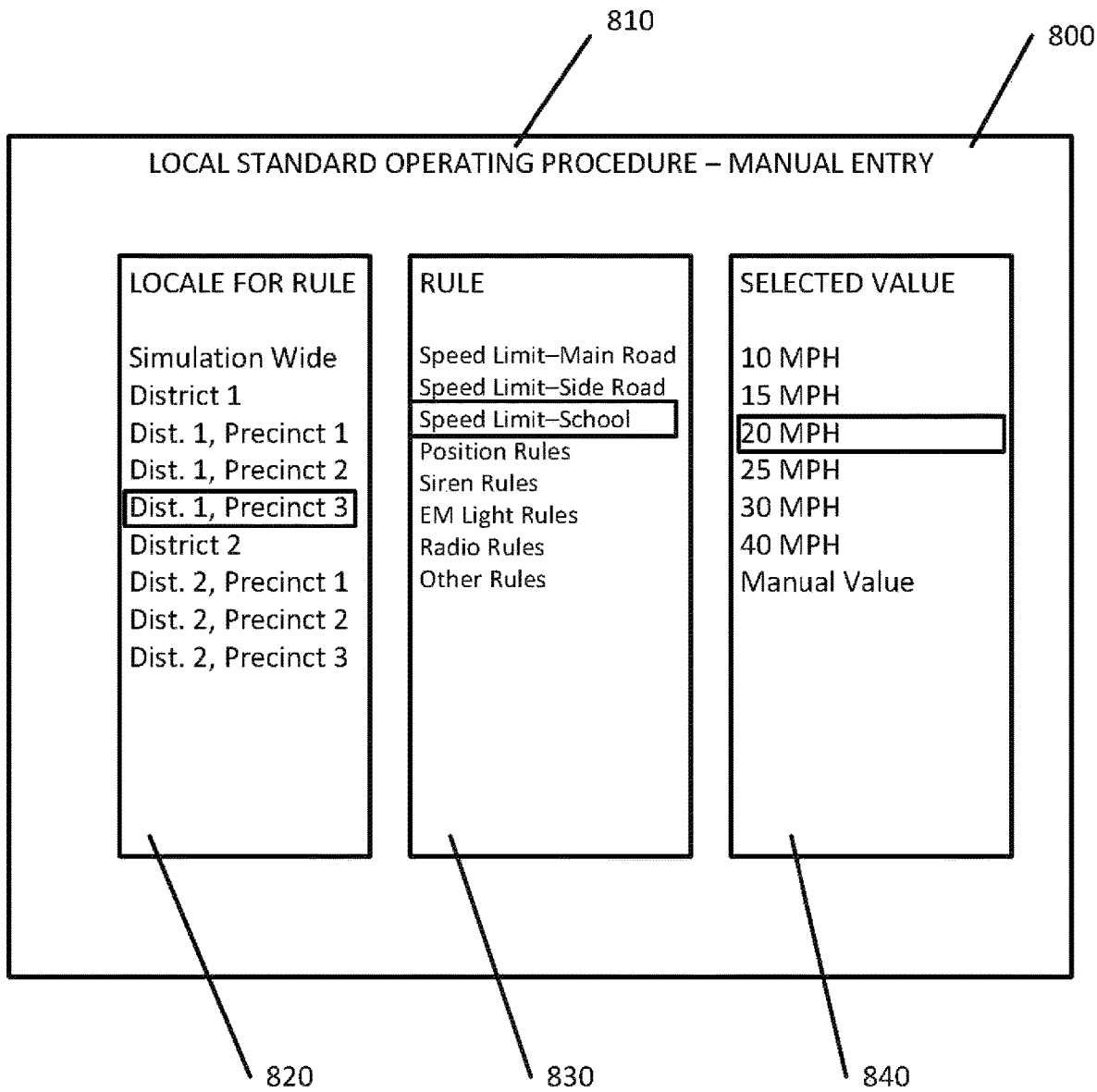
FIG. 10 illustrates an exemplary local standard operating procedure manual entry screen, in accordance with the present disclosure.

FIG. 10 illustrates an exemplary local standard operating procedure manual entry screen. Manual entry screen 800 is illustrated including banner 810. A first portion 820 of screen 800 is useful to define a locale with the simulated driving environment for a new rule to be applied. In the exemplary details of FIG. 10, the user can select from the new rule being created being applied throughout the simulation, in either of two districts, or in specific precincts within either of the districts. Other exemplary locales such as schools, airport, hospitals, or off-road locations can be provided for selection. Second portion 830 includes a list of rules that can be applied in the selected locale. Third portion 840 includes values that can be selected for the new rule. The locales, rules, and values provided are intended to be non-limiting examples.

Rating systems can take many forms. Red, yellow, and green ratings are provided in the illustrations. Other similar scalar outputs can be provided, such as 2, 3, or 4 different sounds indicating how well the driver performed on a certain milestone with pitch or symbolic meaning in the sounds relaying the results. In another example, details in the simulation can be used to relay the results, for example, with people at the destination booing, being indifferent, or clapping based upon the accumulated test results.

The disclosed driving simulation system can be configured to present feedback to the driver during the simulation, enabling the driver to understand where he or she is doing well or where he or she is failing to meet the criteria of the simulation. This feedback can be directed to the driver in a way that prevents a third-party onlooker, such as peers or supervisors, from perceiving the feedback provided to the driver. Such private communication of the feedback to the driver encourages drivers to utilize the training without fear of ridicule or reprimand. Such feedback can be provided on a display screen configured to permit a viewer from only one direction to see the screen. Such feedback can be provided without textual indicators, such that an onlooker would not be able to easily understand the feedback. Such untextualized feedback can be color based, for example, with red, yellow, and green indicators being used as disclosed herein to convey performance of the driver. In another example, a driver can be provided with optional graphic cues that can be selected to provide feedback to the driver. For example, a graphic of a simulated side mirror of the vehicle upon the display screen can be selected to flash or wobble one, two, or three times based upon the poor, marginal, or good performance of the driver. In another example, simulated reflected sunlight illustrated upon the display within the driving environment can blink or change intensity based upon the determined performance of the driver. In such a system, where display objects can be customized to flash or otherwise alter appearance to provide feedback to the driver, the driver can additionally select false indications to be generated in the display, for example, to confuse onlookers trying to determine how well the driver is performing in the driving simulation.

In another example, control surfaces of the simulator or a cellular phone of the driver can be made to vibrate a selected number of pulses to indicate performance to the driver. In another example, audio feedback provided through headphones worn by the driver can be used to indicate performance to the driver. In any of these examples, a later, private viewing of more detailed analysis of the driver's performance can be provided, for example, upon a website or through an email message. The provided examples are non-limiting, many alternative untextualized feedback indicators can be used to provide feedback privately to a driver during operation of a driving simulation, and the disclosure is not intended to be limited to the particular examples provided herein.

A driving simulation system conveying private feedback to the driver can include a simulated driver cockpit including a steering wheel and at least one video display providing a simulated driving environment to the driver. The system can further include a computerized simulation control module including a computerized processor and programming configured to operate a driving simulation through the simulated driver cockpit. The driving simulation can include a plurality of driving rules. The programming can be further configured to monitor performance of the driver during the driving simulation, compare the performance of the driver to the driving rules, and while the driving simulation is still in operation, provide untextualized feedback to the driver regarding performance of the driver. Providing untextualized feedback can include displaying to the driver one of a red indicator to indicate poor performance, a yellow indicator to indicate marginal performance, and a green indicator to indicate good performance. Providing untextualized feedback can alternatively include displaying to the driver a series of colored indicators to indicate to the driver whether the monitored performance passes each of the driving rules of the driving simulation, each colored indicator including one of a red indicator to indicate poor performance, a yellow indicator to indicate marginal performance, and a green indicator to indicate good performance.

According to one embodiment of the disclosure, a driving simulation system configured to train a driver is provided. The system includes a simulated driver cockpit, which includes simulated vehicle controls which may include a pedal input and a steering wheel and at least one video display providing a simulated driving environment to the driver. The system further includes a computerized simulation control module including a computerized processor and programming configured to operate a driving simulation through the simulated driver cockpit. The driving simulation includes driving rules. The computerized simulation control module further includes programming to monitor performance of the driver during the driving simulation and compare the performance of the driver to the driving rules. The computerized simulation control module further includes programming to provide untextualized feedback to the driver regarding performance of the driver. This untextualized feedback may be provided during and/or after the simulation.

Figure 11:
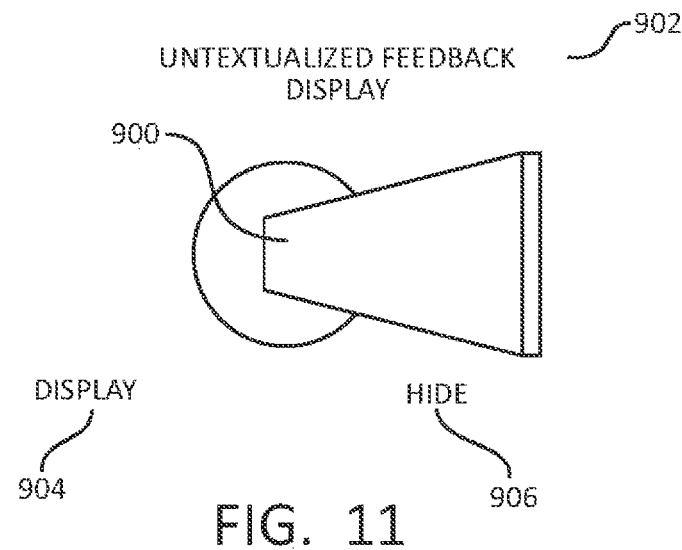
FIG. 11 schematically illustrates a toggle switch that may be provided to the user to selectively display and selectively hide untextualized feedback, in accordance with the present disclosure.

Display of the untextualized feedback may be conditional or controlled based upon input to a display control input by the user. In one example, a dedicated button, knob, or other similar dedicated display input device may be provided to the user, for example enabling selective display or hiding of the untextualized feedback. FIG. 11 schematically illustrates a toggle switch 900 that may be provided to the user to selectively display untextualized feedback. The toggle switch 900 may be an electromechanical switch capable of two positions. A switch label 902 may be provided to give clarity to the user of the purpose of the toggle switch 900. Label 904 provides a switch position to selectively display untextualized feedback. Label 906 provides a switch position to selectively hide untextualized feedback. In another embodiment, one or more electromechanical buttons may be utilized in place of the toggle switch.

Figure 12:
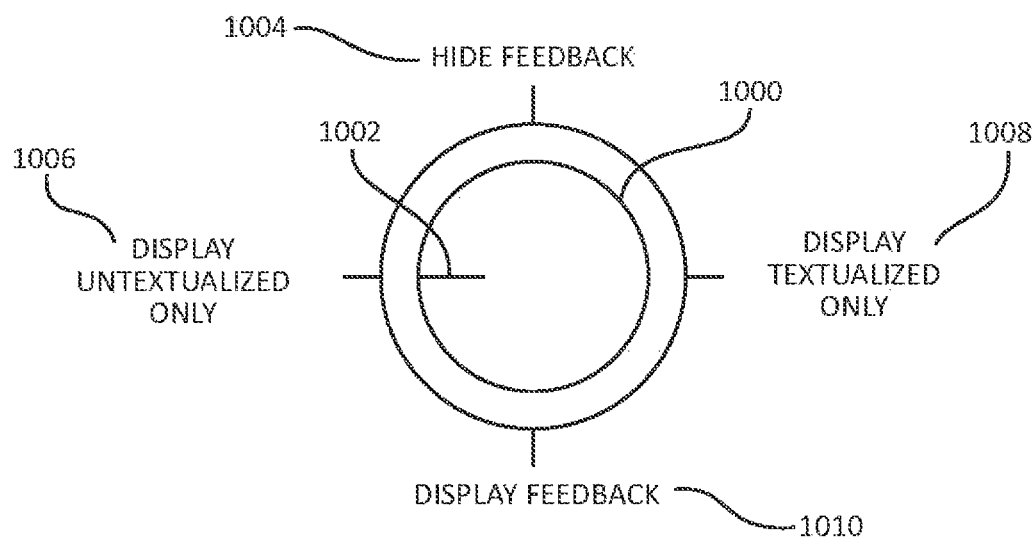
FIG. 12 schematically illustrates a control knob that may be provided to the user to selectively hide feedback, selectively display feedback, and selectively provide a portion of available feedback, in accordance with the present disclosure.

In addition to providing control over untextualized feedback, control can be provided over textualized feedback or textualized description of the untextualized feedback. Textualized feedback may include a specific summary or score and/or simulation milestones, may include a legend or key useful to interpret displayed untextualized information, or other similar description that may be provided related to operation of the simulation. FIG. 12 schematically illustrates a control knob 1000 that may be provided to the user to selectively hide feedback, selectively display feedback, and selectively provide a portion of available feedback. The control knob 1000 include a control indicator 1002 enabling the user to turn the knob 1000 to a desired setting. Label 1004 indicates a knob rotation setting to selectively hide feedback. Label 1006 indicates a knob rotation setting to selectively display untextualized feedback and hide textualized feedback. Label 1008 indicates a knob rotation setting to selectively hide untextualized feedback and display textualized feedback. Label 1010 indicates a knob rotation setting to selectively display untextualized feedback and textualized feedback.

In another example, the display control input may include an existing driving control input. User activation of the driving control input may be utilized to selectively display and selectively hide the untextualized feedback. Non-limiting examples of such driving control inputs include the brake pedal, an accelerator pedal, a clutch pedal, the steering wheel, a horn button upon the steering wheel, a transmission control lever or mechanism, a radio button or knob, and a siren switch. Such control inputs that are utilized during the simulation to provide control input signals for the simulated vehicle may not be useful to activate and deactivate the untextualized feedback during the simulation as such operation would interfere with use of the controls through the simulation. However, such inputs to the driving control inputs after completion of the simulation may be useful to permit the user to casually or discreetly display and then hide the feedback without attracting attention of onlookers. For example, after completion of the simulation, a brake pedal may be utilized, such that a first activation of the brake pedal may display the untextualized feedback and a second activation of the brake pedal may hide the untextualized feedback. In another example, a clutch pedal may be utilized to selectively display the untextualized feedback, and the accelerator pedal may be utilized to selectively hide the untextualized feedback. Any control input device provided to the user may be utilized to selectively display and/or hide the untextualized feedback.

Similarly, a control input may be utilized to selectively display and hide textualized feedback or information. For example, one control input such as the brake pedal may be utilized to selectively display and hide untextualized feedback, and simultaneously, a second control input such as the accelerator pedal may be utilized to selectively display and hide textualized feedback. In another example, a same control input may be utilized to cycle through a feedback display sequence, for example, with a first press of the steering wheel horn button displaying the untextualized feedback, a second press of the wheel horn button displaying the textualized feedback, and a third press of the wheel horn button hiding the untextualized and the textualized feedback. Such a cycle may be repeatable, for example, with every three presses of the horn button starting the feedback display sequence over again.

The disclosure has described certain preferred embodiments and modifications of those embodiments. Further modifications and alterations may occur to others upon reading and understanding the specification. Therefore, it is intended that the disclosure is not limited to the particular embodiment(s) disclosed as the best mode contemplated for carrying out this disclosure, but that the disclosure will include all embodiments falling within the scope of the appended claims.

What is claimed is:

1. A driving simulation system configured to train a driver, the system comprising:
    a simulated driver cockpit, including:
        simulated vehicle controls;
        a display control input; and
        at least one video display providing a simulated driving environment to the driver; and
    a computerized simulation control module including programming to:
        operate a driving simulation through the simulated driver cockpit, the driving simulation including a set of driving rules;
        monitor performance of the driver during the driving simulation;
        compare the performance of the driver to the set of driving rules;
        generate a driving performance score regarding performance of the driver relative to the set of driving rules; and
        operating an instructor-led review of the performance of the driver, including:
            receiving an input from a driving instructor regarding the performance of the driver relative to the set of driving rules; and
            displaying an output to the driver based upon the driving performance score and the input from the driving instructor.

2. The driving simulation system of claim 1, wherein the output to the driver is additionally displayed to the driving instructor.

3. The driving simulation system of claim 2, wherein the output to the driver includes a timeline describing one or more events that occurred during the driving simulation.

4. The driving simulation system of claim 3, wherein the timeline includes a verbal description of an action of the driver that earned a portion of the driving performance score.

5. The driving simulation system of claim 3, wherein a second input from the driving instructor enables the output to jump back to a particular event in the driving simulation.

6. The driving simulation system of claim 3, wherein a second input from the driving instructor edits the driving performance score.

7. The driving simulation system of claim 1, wherein a second input from the driving instructor modifies the set of driving rules.

8. The driving simulation system of claim 7, wherein the second input from the driving instructor selects a local standard operating procedure to modify the set of driving rules.

9. The driving simulation system of claim 8, wherein a third input from the driving instructor resolves disagreement between the set of driving rules and the local standard operating procedure.

10. The driving simulation system of claim 1, wherein the input from the driving instructor includes an indication from the instructor that the simulation is completed.

11. The driving simulation system of claim 1, wherein the input from the driving instructor includes a comment related to an event that occurred during the driving simulation.

12. The driving simulation system of claim 1, wherein the input from the driving instructor includes a verbal comment made by the driving instructor.

13. The driving simulation system of claim 1, wherein the output is provided to the driver upon an Internet enabled device separate from the simulated driver cockpit.

14. A driving simulation system configured to train an emergency response driver, the system comprising:
    a simulated driver cockpit, including:
        simulated vehicle controls;
        a display control input;
        at least one video display providing a simulated driving environment to the driver; and
        at least one emergency vehicle control input configured to simulate an emergency siren or a radio control; and
    a computerized simulation control module including programming to:

operate a driving simulation through the simulated driver cockpit, the driving simulation including a set of driving rules related to operation of an emergency responder vehicle;

monitor performance of the driver during the driving simulation including operation of the emergency vehicle control input;

compare the performance of the driver to the set of driving rules;

generate a driving performance score regarding performance of the driver relative to the set of driving rules; and operating an instructor-led review of the performance of the driver, including:
   receiving an input from a driving instructor regarding the performance of the driver relative to the set of driving rules; and
   displaying an output to the driver based upon the driving performance score and the input from the driving instructor.

15. The driving simulation system of claim 14, wherein the output to the driver is additionally displayed to the driving instructor.

16. The driving simulation system of claim 15, wherein the output to the driver includes a timeline describing one or more events that occurred during the driving simulation.

17. The driving simulation system of claim 16, wherein the timeline includes a verbal description of an action of the driver that earned a portion of the driving performance score.

18. The driving simulation system of claim 16, wherein a second input from the driving instructor enables the output to jump back to a particular event in the driving simulation.

19. The driving simulation system of claim 16, wherein a second input from the driving instructor edits the driving performance score.

20. The driving simulation system of claim 14, wherein a second input from the driving instructor modifies the set of driving rules.

* * * * *